United States Patent
Wolfs et al.

(10) Patent No.: US 6,355,223 B1
(45) Date of Patent: Mar. 12, 2002

(54) CLOSED LOOP PROCESS FOR PRODUCING CHLORINE FROM HYDROGEN CHLORIDE

(75) Inventors: Warren M. Wolfs; Eric W. Evanson, both of Vancouver; Clive M.H. Brereton, Richmond, all of (CA)

(73) Assignee: Noram Engineering & Constructors, Ltd., Vancouver (CA)

(*) Notice: Subject to any disclaimer, the term of this patent is extended or adjusted under 35 U.S.C. 154(b) by 0 days.

(21) Appl. No.: 09/476,178

(22) Filed: Dec. 30, 1999

(51) Int. Cl.⁷ .......................... C01B 7/00; C01B 21/38; C01B 21/00
(52) U.S. Cl. ................. 423/507; 423/390.1; 423/394.2; 423/235; 423/241
(58) Field of Search ............................... 423/500, 502, 423/507, 241, 235, 390.1, 393, 394, 394.2, 239.1, 239.2

(56) References Cited

U.S. PATENT DOCUMENTS

| | | | | |
|---|---|---|---|---|
| 537,508 A | * | 7/1895 | Wallis ........................ 423/507 |
| 3,152,866 A | * | 10/1964 | Kamlet ........................ 423/507 |
| 3,152,870 A | * | 10/1964 | Baumgartner et al. ...... 423/507 |
| 3,201,201 A | * | 8/1965 | Van Dijk et al. |
| 3,449,079 A | * | 6/1969 | Jongenburger et al. |
| 3,451,776 A | * | 6/1969 | Van Dijk et al. |
| 3,544,274 A | * | 12/1970 | Van Dijk et al. ........... 423/502 |
| 3,950,501 A | | 4/1976 | Chien et al. |
| 4,027,000 A | * | 5/1977 | Van Dijk ..................... 423/502 |

* cited by examiner

Primary Examiner—Steven Bos
(74) Attorney, Agent, or Firm—Needle & Rosenberg, P.C.

(57) ABSTRACT

A method for oxidizing HCl to produce pure chlorine gas by reacting HCl with a mixture of sulfuric and nitric acids. Chlorine gas is evolved. Spent nitric and sulfuric acids are first regenerated by contact with air or oxygen. After regeneration, the entire stream of regenerated acid, or major portion thereof, is reconcentrated. The concentration of sulfuric acid occurs at lower strengths (60%–80%) and temperatures. The concentrated acid may be used to oxidize more HCl. Heat evolved by the regeneration of the spent acids is carried into the acid concentration stage.

13 Claims, 3 Drawing Sheets

CLOSED LOOP PROCESS FOR PRODUCING CHLORINE FROM HYDROGEN CHLORIDE

FIELD OF THE INVENTION

Figure 1:
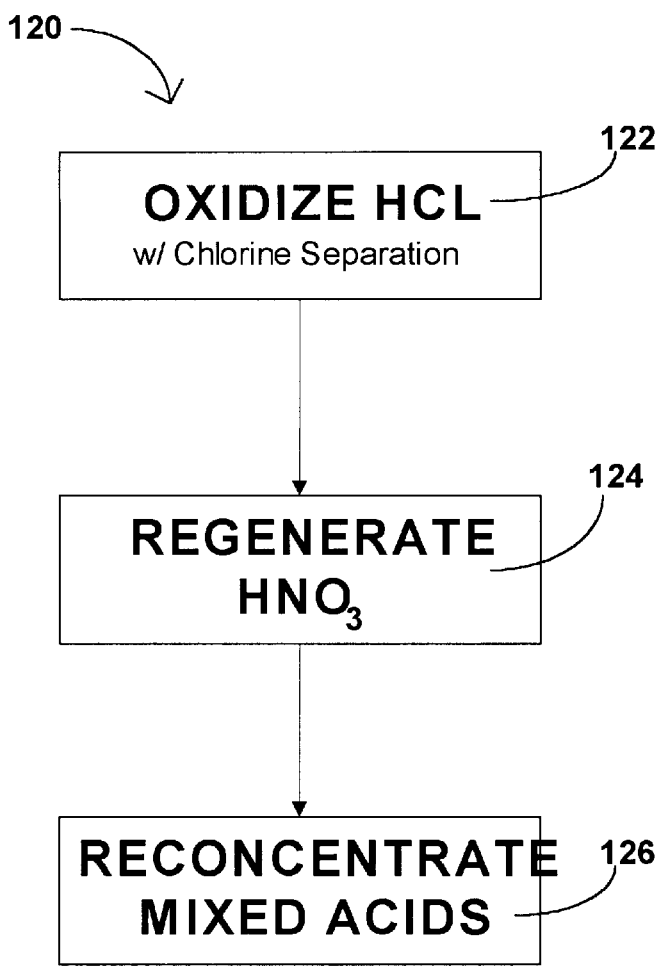

This invention concerns a continuous process in which hydrogen chloride (HCl) is oxidized to produce a chlorine ($Cl_2$) gas product.

BACKGROUND OF THE INVENTION

Various processes in the chemical industry consume $Cl_2$ as a feedstock or intermediary and produce HCl as a by-product. Millions of tonnes of HCl are produced annually around the world in this manner. Usually, the chemical producer has no immediate use for the HCl. The required disposal of this waste HCl may be an economic burden. There is a need for a process in which by-product HCl is oxidized to $Cl_2$ for reuse as a chemical feedstock. To be implemented in the chemical industry, such a process will need to be operationally robust, efficient in its overall energy use and economical.

Chien et al. U.S. Pat. No. 3,950,501 discloses a continuous process for oxidizing HCl to $Cl_2$. The process contacts, in a reactor, HCl gas with a mixed acid stream. The term "mixed acid" refers to an aqueous mixture of sulfuric and nitric acid. The nitric acid reacts with the HCl according to the reaction:

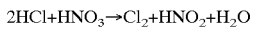

$$2HCl+HNO_3 \rightarrow Cl_2+HNO_2+H_2O$$

High purity $Cl_2$ is produced. The sulfuric acid, in the mixed acid, acts as a dehydrating agent and absorbs the water produced by the reaction. The mixed acid is then referred to as spent acid, the connotation being that the absorbed water will need to be removed before the mixed acid can be reused in the process. Nitrous acid produced by the reaction is thought to react with the sulfuric acid to form nitrosyl sulfuric acid: $H(NO)SO_4$.

In the Chien et al. process, the water produced as a result of the HCl oxidation is removed from a minimized split stream of spent acid, typically no more than 10% of the entire spent acid stream. First, this split stream of spent acid is stripped by air or oxygen entered into the process. Nitrosyl sulfuric acid is converted to nitrous acid, which decomposes into $NO_2$ and travels with the stripping gas into a nitric acid regenerator. The stripped sulfuric acid is sent to a concentrator where water is removed to obtain a sulfuric acid strength in the range of 93% to 98%. All concentrations are in wt % unless stated otherwise. The majority of the spent acid is delivered directly to a nitric acid regenerator in which $HNO_2$ is converted to $HNO_3$ through contact with oxygen gas.

There are several inefficiencies inherent in the Chien et al. process. One drawback is that during normal operation, the unit operations of the process may not be stable, resulting in either unoxidized HCl in the product $Cl_2$ or a loss of nitric acid from the process. To be efficient, the Chien process must maintain an exact 1:2 stoichiometric ratio of $HNO_3$ to HCl in the HCl oxidizer. It is impractical to regulate this ratio exactly. When excess HCl is present in the HCl oxidizer, the excess HCl will not be oxidized and will be carried out of the process in the $Cl_2$ product. Conversely, when excess nitric acid is present in the HCl oxidizer, the excess nitric acid travels with the spent acid. A portion of the nitric acid in the spent acid split stream is lost from the process via the acid concentrator.

Also, the Chien et al. process does not use energy efficiently. The significant energy released in the regeneration of the nitric acid cannot be easily or fully employed in reconcentrating the spent sulfuric acid split stream due to the process requirements of reconcentrating 93% to 98% sulfuric acid. Concentrating sulfuric acid to such strengths is energy intensive, requiring a high temperature acid concentrator.

SUMMARY OF THE INVENTION

This invention provides a process for converting HCl into $Cl_2$. In preferred embodiments of the invention, it is to be operated as a continuous process. The process exhibits robust and stable operation, reduced nitric acid losses, efficient process energy integration and does not require sulfuric acid to be highly concentrated.

The process involves a sequence of three principal steps or stages.

In the first step, HCl is reacted with an aqueous oxidizing mixture of nitric and sulfuric acids, producing $Cl_2$ gas and water in a stream of spent acids. In addition, this step includes drawing off the $Cl_2$ for further treatment. The spent acid stream consists of nitrous acid (reduced nitric acid), sulfuric acid and water.

The second step regenerates the nitric acid. The nitrous acid, in the stream of spent acids, is oxidized by air or oxygen entering the process.

The third step involves the removal of water, created in the first step of the process, from the spent nitric and sulfuric acid stream. Preferably, the entire stream from the nitric acid regeneration step is used in this re-concentration step. This minimizes the concentration at which the sulfuric acid is re-concentrated. Highly reconcentrated sulfuric acid and the corresponding high temperatures necessary to effect such concentration, are not required.

In step three, the nitric acid is recovered for reuse in the process. This allows excess nitric acid to be used in process step one, achieving robust and stable process operation (complete oxidation of HCl), without the loss of nitric acid from the process.

As the stream of spent acid is reconcentrated after both the HCl oxidation and nitric acid regeneration steps, the heat released from both these reaction steps can be efficiently used in the reconcentrating of the spent mixed acid stream.

Further features and advantages of the invention are described below.

DESCRIPTION

Figure 2:
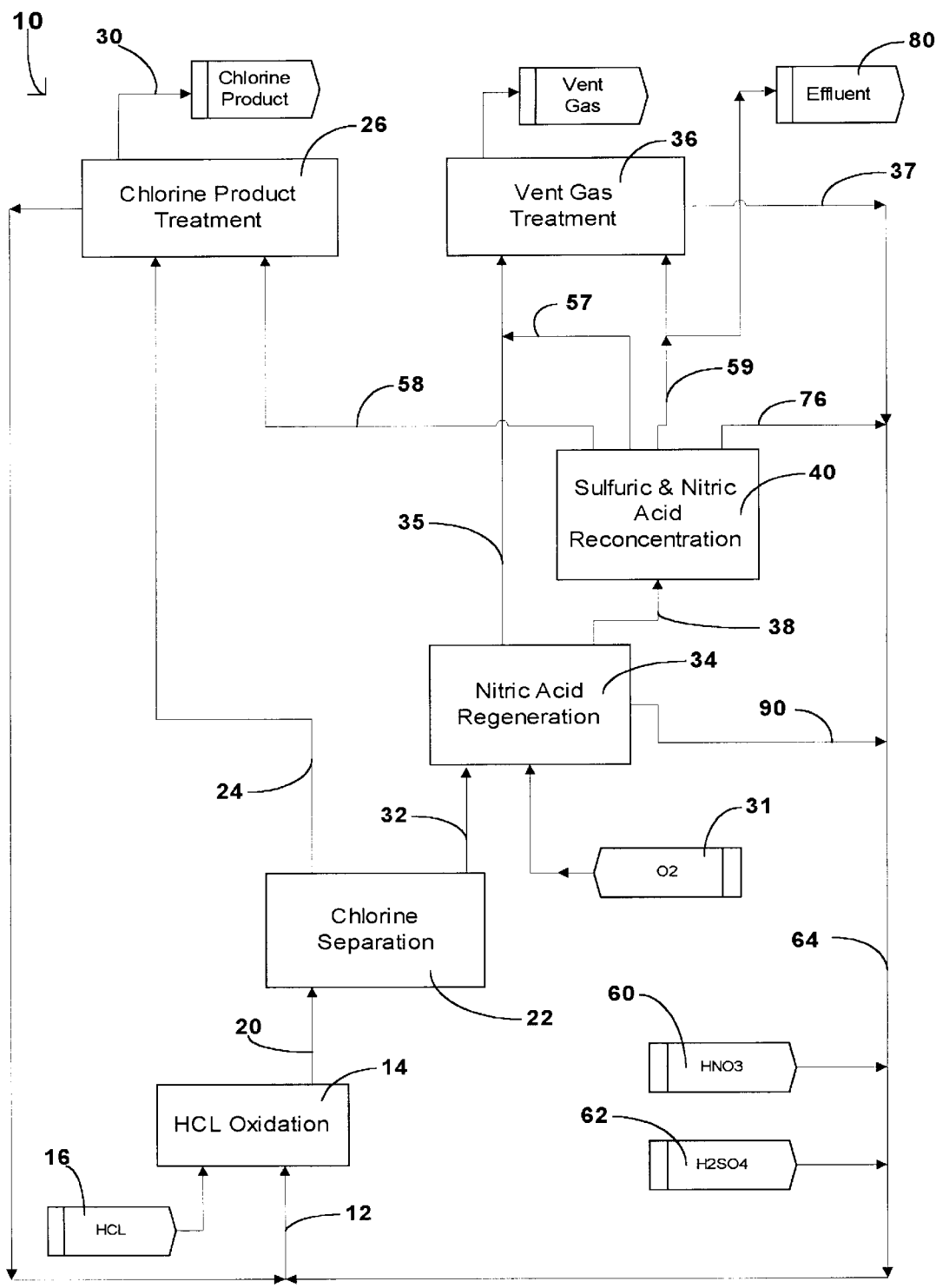

This invention is a continuous process for producing $Cl_2$ from HCl. FIG. 1 schematically illustrates the three steps in a method 120 according to the invention. FIG. 2 shows in schematic view an apparatus 10 for carrying out the process of the invention.

Method 120 begins when HCl is contacted, in a reactor, with a mixture of nitric and sulfuric acid (mixed acid) which react to form $Cl_2$, $HNO_2$ and water, as described by Chien et al. The $Cl_2$ gas is then separated from the aqueous mixture of sulfuric and nitrous acids, and possibly excess nitric acid, and may be subsequently dried, condensed and/or compressed as required (step 122). To ensure the complete reaction of all HCl there is preferably an excess of nitric acid in the reactor. The mixed acid is withdrawn from the reactor.

The method 120 then continues in a second reactor where the nitric acid is regenerated. Nitrous acid in the spent acid stream is oxidized with air or oxygen, as described by Chien et al. (step 124).

Only then is the water, formed during the oxidation of the HCl (step 122), separated from the spent acid steam. The separation process (step 126), enables both regenerated and excess nitric acid to be recovered and re-concentrated for reuse in the process. Also, the sulfuric acid is re-concentrated, for reuse in the process, to a strength in the range of about 60%–80% (compared to 93%–98% in the prior art).

The re-concentration of sulfuric acid at lower strengths, due to the entire stream or a large part thereof being used, allows the reconcentration to be conducted at lower temperatures and with simpler equipment. Additionally, the heat of reaction released in the first two steps in the method (step 122 and step 124) can be beneficially utilized in the water separation process.

FIG. 2 shows in schematic view an apparatus 10 for carrying out the process of the invention. This apparatus shows a mixture, containing nitric acid, sulfuric acid and water, being introduced though an inlet 12 into a reaction vessel 14. The acid mixture entering reaction vessel 14 preferably comprises about 1%–6% nitric acid, about 66.5%–76% sulfuric acid and about 23%–27.5% water. HCl gas from a source 16 of HCl gas is also introduced into reaction vessel 14. In reaction vessel 14 a reaction occurs in which the HCl is oxidized to $Cl_2$. In addition, the reaction results in the reduction of nitric acid to nitrous acid and the formation of water and trace byproducts. The nitrous acid may be considered to be bound to the sulfuric acid in the form of nitrosyl sulfuric acid, $HNOSO_4$. The sulfuric acid in reaction vessel 14 acts as a dehydrating agent and absorbs the water produced.

The reaction vessel 14 typically comprises a tray column or other suitable type of reaction vessel. In reaction vessel 14, the temperature is preferably maintained in the range of about 80° C.–100° C. and pressure is maintained in the range of about 1 bar–25 bar.

Fluids containing reaction products are drawn off from reaction vessel 14 through a conduit 20 to a $Cl_2$ separator 22. $Cl_2$ separator 22 may be any suitable gas-liquid separator or, in the case of using a tray tower for reaction vessel 14, as indicated above, a separate vessel for the separation of $Cl_2$ may not be required.

Gaseous $Cl_2$ is drawn off through a vent 24 to a $Cl_2$ treatment system 26. The $Cl_2$ treatment system 26 reabsorbs gaseous byproducts to purify the $Cl_2$ gas. For example, $Cl_2$ treatment system 26 may include a tray tower in which a fluid, such as 60%–80% sulfuric acid, absorbs and removes various gaseous byproducts, primarily NOCl, $NO_2Cl$ and water vapour, in the stream of $Cl_2$ gas from vent 24. Purified $Cl_2$ is taken off through outlet 30. Gaseous $Cl_2$ from the $Cl_2$ treatment system 26 may optionally be further processed by compression, pressure reduction and/or further purification steps to produce $Cl_2$ to a specification suitable for the intended application.

The liquid phase from $Cl_2$ separator 22 contains sulfuric acid, nitrous acid, water and possibly excess nitric acid. This liquid phase is directed through conduit 32 to a nitric acid regeneration vessel 34.

In nitric acid regeneration vessel 34, nitrous acid is brought into contact with air and/or oxygen from source 31 and reacts to produce nitric acid. The principal reaction which occurs in nitric acid regeneration vessel 34 is:

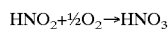

$$HNO_2 + \tfrac{1}{2} O_2 \rightarrow HNO_3$$

Nitric acid regeneration vessel 34 may be a tray column or another suitable gas-liquid contactor. Preferably, temperatures in the range of about 80° C.–140° C. and pressures of 1 bar–25 bar, are maintained within nitric acid regeneration vessel 34. Gases are vented through a vent 35. The vent gases contain water and trace NOx compounds produced by decomposition of nitric and nitrous acids. NOx refers to a mixture of NO, $NO_2$, $N_2O_3$ and $N_2O_4$. A vent gas scrubber 36 recaptures the acid vapours and NOx compounds. The acid vapours and NOx compounds are absorbed into weak, cool nitric acid to be recirculated via conduits 37 and 64 to reaction vessel 14.

Figure 3A:
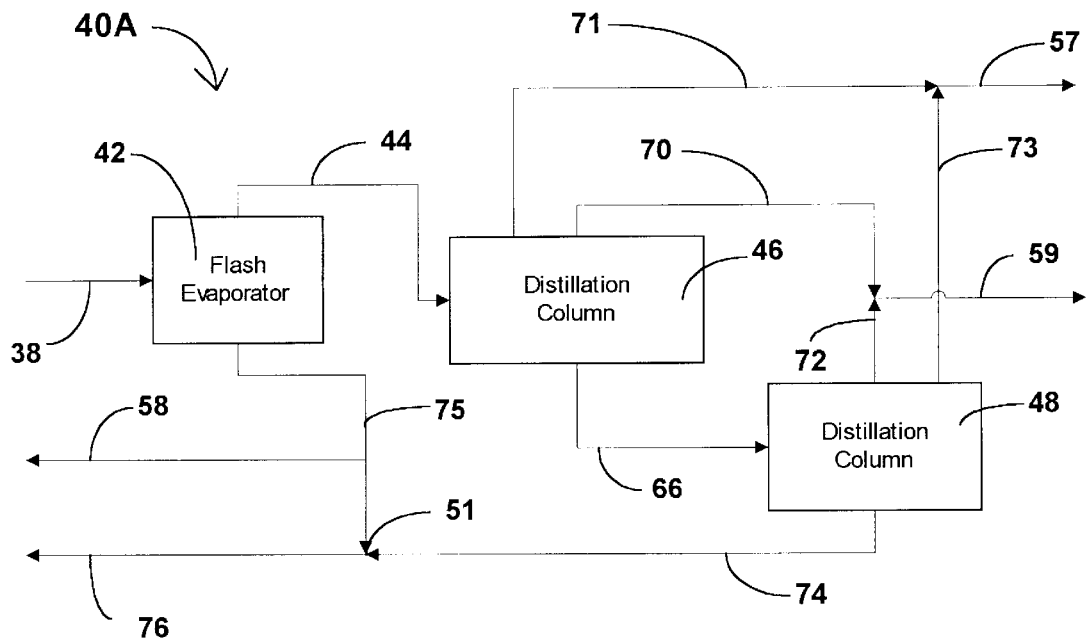
Figure 3B:
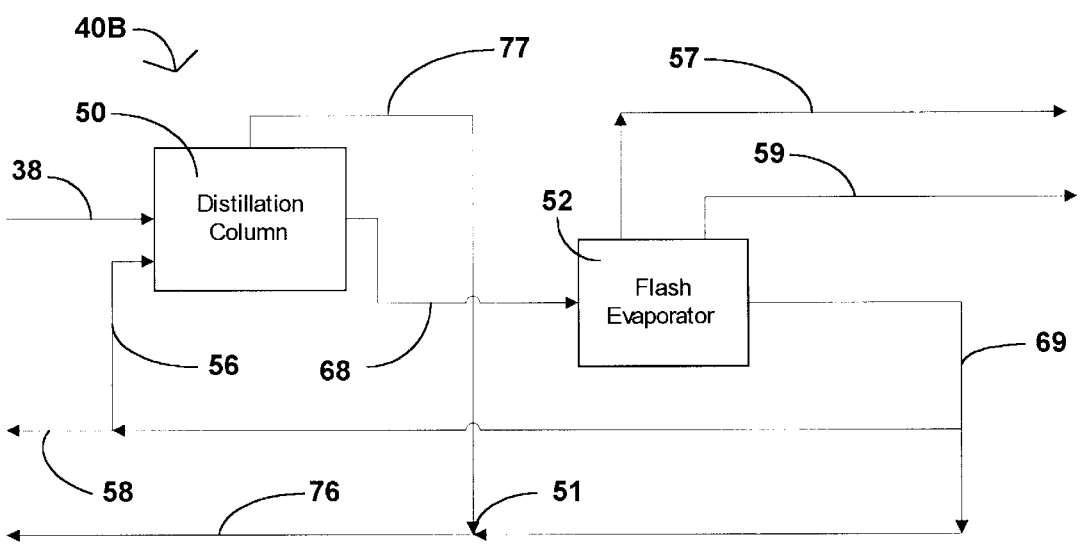

The majority, preferably all, of the reoxidized mixed acid is drawn off through conduit 38 to a sulfuric and nitric acid reconcentration system 40. In some instances, it may be beneficial to have a small bypass flow, conduit 90, around the acid reconcentration system. FIGS. 3A and 3B show alternative acid reconcentration systems 40A and 40B. The two alternative reconcentration systems provide alternative means of removing water from a water/sulfuric acid/nitric acid ternary mixture.

Where the sub-azeotropic acid reconcentration system 40A of FIG. 3A is used, the stream of nitric and sulfuric acids from nitric acid regeneration vessel 34 is delivered through conduit 38 to a flash evaporator 42 which flashes water and nitric acid vapour, leaving sulfuric acid in a concentration range of 60–80%. Preferably a concentration of about 70% sulfuric acid is achieved. Some nitric acid remains in the liquid phase and does not flash. Flash evaporator 42 is preferably a vacuum-type evaporator. Vapour is drawn off at outlet 44 and delivered to a distillation column 46. Distillation column 46 may contain only a rectification section. Some vapour condenses in distillation column 46. Water and inert gases are drawn off at the top of the distillation column 46 via conduits 70 and 71 respectively. The inert gases are directed through conduit 57 to vent gas scrubber 46 (FIG. 2). A portion of the water may also be directed through conduit 59 to the vent gas scrubber 36, with the rest sent for further liquid effluent treatment 80, if required.

Condensed sub-azeotropic nitric acid (approximately 60% in concentration) is drawn off at the bottom of distillation column 46 through conduit 66 and delivered to another distillation column 48 which is an atmospheric distillation column. Nitric acid with a concentration of 65% or less is drawn off at the bottom of distillation column 48 through conduit 74. Water and inert gases are drawn off at the top of the distillation column 48, via conduits 72 and 73 respectively. Inert gases are directed through conduit 57 to vent gas scrubber 36. A portion of the water may be directed through conduit 59 to the vent gas scrubber 36, with the rest sent for further liquid effluent treatment 80, if required. The concentrated nitric acid in conduit 74 is mixed at junction 51 with the reconcentrated sulfuric acid which is drawn off from the bottom of flash evaporator 42 through conduit 75 and is returned to reaction vessel 14 for oxidizing more HCl through conduit 76.

A stream of reconcentrated sulfuric acid may be directed from conduit 58 to the chlorine treatment system 26.

The above discussion describes one way to perform sub-azeotrophic nitric acid reconcentration. Other methods are possible, such as two column reconcentration systems. Similarly, the reconcentrated sulfuric and nitric acid could be directed to a pump tank, possibly separate pump tanks, prior to being mixed and directed to reaction vessel 14.

The sub-azeotropic acid concentration system of FIG. 3A avoids distilling thought the nitric acid/water azeotrope but may not be as energy efficient as the super-azeotrophic nitric acid reconcentration system of FIG. 3B.

If the sulfuric and super-azeotropic nitric acid reconcentration system 40B of FIG. 3B is used, then the regenerated nitric and sulfuric acid mixture is introduced through conduit 38 into a distillation column 50. Additional sulfuric acid from the process is also introduced into column 50 as described below. In reconcentration system 40B, sulfuric acid is used as a dehydrating agent to break the nitric acid/water azeotrope. Nitric acid is drawn off through conduit 77 at the top of distillation column 50 as a strong nitric acid stream having a strength greater than 69% and most preferably in the range of 85%–99%. The strong nitric acid is returned via conduit 77 to the main stream of mixed acid at conduit junction point 51.

A mixture of sulfuric acid and water, which is free of nitric acid, is drawn at the bottom of distillation column 50 through conduit 68 and delivered to a flash evaporator 52. Flash evaporator 52 drives off water and inert gases. The inert gases may be directed via conduit 57 to vent gas scrubber 36. A portion of the water may be directed via conduit 59 to scrubber 36 with the rest sent to liquid effluent treatment 80, if required. The resulting reconcentrated sulfuric acid, in the range of 60%–80% though preferably about 70%, is drawn off from flash evaporator 52 through conduit 69. A portion of the concentrated sulfuric acid is returned to distillation column 50 via conduit 56. A portion of the sulfuric acid goes by conduit 58 to chlorine product treatment system 26. The majority of the reconcentrated sulfuric acid is mixed with nitric acid from distillation column 50 at conduit junction point 51 and is delivered via conduit 76 to reaction vessel 14 to be reused in the oxidation of HCl. In alternative embodiments of this process, the reconcentrated sulfuric and nitric acid would be directed to a pump tank, possibly separate pump tanks, prior to being mixed and directed to reaction vessel 14.

Super-azeotropic nitric reconcentration system 40B is considered to be somewhat more energy efficient than the sub-azeotrophic system 40A which is described above. Furthermore, water vented from flash evaporator 52 contains essentially no nitric acid or NOx species, so there is no need to remove nitrogen-containing species from this water stream.

Ideally, no sulfuric or nitric acid is lost from the process. In practice, however, small amounts of nitric and sulfuric acid will need to be fed into the process as make up. FIG. 2 shows one possible point of feeding the makeup acids in the process, though there are several different possible points of application. A source 60 of nitric acid and a source 62 of sulfuric acid feed into conduit 64, which carries concentrated acid from the acid reconcentration system 40 and conduit 76, and from vent scrubber 36 and conduit 37, back into reaction vessel 14.

The regeneration of nitric acid, which occurs in nitric acid regeneration vessel 34, is exothermic. Heat generated during the regeneration of nitric acid in reaction vessel 34 can be carried in the fluid through conduit 38 into the sulfuric and nitric acid reconcentration system 40. This energy can then be directly used in the acid reconcentration system using a vacuum flash process. Use of the entire spent acid stream, or a majority thereof, in the acid reconcentration system minimizes the reconcentration step required, preferred sulfuric acid concentrations being 68–70%. This lowers the temperature at which the reconcentration occurs such that the temperature/heat of the regenerated mixed acid exiting vessel 34 can be efficiently used to reconcentrate the majority, if not all, of the spent acid steam.

By contrast, the method disclosed by Chien at al. requires the acid mixture to be cooled after it is regenerated. Transfer of this heat to its reconcentration process, through the use of interchangers, would be of little benefit due to the high temperatures required to reconcentrate the small (less than 10%) sulfuric acid split stream to 93%–98%.

A small stream of reconcentrated sulfuric acid is directed through conduit 58 to chlorine purification tower 26. This stream of sulfuric acid is used to scrub nitrogen-containing species and other byproducts from the product stream and are recycled back into the process. NOx is scrubbed from various vent streams using a NOx scrubber. The NOx scrubber produces nitric acid which is recycled back into the process.

An advantage of the process is that it can be practised by supplying an excess of nitric acid in reaction vessel 14, i.e. in excess of 1:2 mole ratio of $HNO_3$ to HCl. This insures the HCl is completely and efficiently oxidized to produce $Cl_2$. Because the process of this invention can operate efficiently in an excess of nitric acid, the process is quite robust and stable in regard to normal operating variations in the ratio of nitric acid to HCl supplied to reaction vessels 14.

As will be apparent to those skilled in the art, in the light of the foregoing disclosure many alterations and modifications are possible in the practice of this invention without departing from the spirit or scope thereof. For example, while the foregoing description has described chlorine gas being drawn off in a gas separator which is separate from the reaction vessel in which the chlorine gas is generated, a single vessel could serve both as a reaction vessel and as a gas separator. Further, while the sub-azeotropic acid reconcentration system 40A, of FIG. 3A, is shown as having two distillation columns, other sequences of columns or a single column could also be used. All that is necessary is that there be a flash evaporator which produces a vapor having a composition below the nitric acid/water azeotrope. Subsequent separation of the vapor produces a water stream and an acid stream with a composition below the nitric acid/water binary azeotrope.

Accordingly, the scope of the invention is to be construed in accordance with the substance defined by the following claims.

What is claimed is:

1. A continuous process for the production of $Cl_2$ from HCl, said process comprising the steps of:
   (a) reacting HCl with an aqueous oxidizing mixture comprising nitric acid and sulfuric acid, so as to produce $Cl_2$ in a stream comprising nitrogen-containing species, sulfuric acid and water;
   (b) oxidizing at least a portion of the nitrogen-contain species so as to form nitric acid in the stream;
   (c) removing water created in step (a) from said stream, wherein the step of removing water is carried out in a super-azeotropic acid reconcentration system and comprises the steps of:
      (i) delivering said stream to a distillation column;
      (ii) introducing sulfuric acid into said column;
      (iii) drawing off nitric acid from said distillation column;
      (iv) drawing off a mixture of sulfuric acid and water at the bottom of said distillation column and delivering the mixture to a flash evaporator; and
      (v) drawing off reconcentrated sulfuric acid from said flash evaporator.

2. A process according to claim 1 wherein at least a majority of the nitrogen-containing species is oxidized.

3. A process according to claim 1 wherein the majority of or entire stream from step (b) is used in the re-concentration step (c).

4. A process according to claim 1 wherein said sulfuric acid is reconcentrated in step (c) to a concentration in the range of about 60%–80%.

5. A process according to claim 1 wherein the stoichiometric mole ratio of $HNO_3$ to HCl in step (a) is in excess of 1:2.

6. A process according to claim 1 further comprising the step of scrubbing said $Cl_2$ with scrub acid.

7. A process according to claim 6 wherein said scrub acid is sulfuric acid having a concentration of about 60%–80%.

8. A process according to claim 6 wherein said scrub acid is returned to said process for use in step (a) of the process.

9. A process according to claim 1 wherein the process vent gases are scrubbed of nitrogen-containing species.

10. A process according to claim 9 wherein said nitrogen species scrubbed from the vent gases are reacted to form nitric acid and returned to said process for use in step (a) of the process.

11. A process according to claim 1 wherein heat released from steps (a) and (b) is used in step (c).

12. A continuous process for the production of $C_2$ from HCl, said process comprising the steps of:
   (a) reacting HCl with an aqueous oxidizing mixture comprising nitric acid and sulfuric acid, so as to produce $Cl_2$ in a stream comprising nitrogen-containing species, sulfuric acid and water;
   (b) oxidizing at least a portion of the nitrogen-contain species so as to form nitric acid in the stream;
   (c) removing water created in step (a) from said stream, wherein step (c) is carried out in a sub-azeotropic acid reconcentration system and comprises the steps of:
      (i) flashing water and nitric acid vapor from said stream, leaving sulfuric acid having a concentration in the range of 60%–80%;
      (ii) delivering said vapor to a distillation column; and
      (iii) drawing off sub-azeotropic nitric acid from said distillation column.

13. A continuous process for the production of $Cl_2$ from HCl, said process comprising the steps of:
   (a) reacting HCl with an aqueous oxidizing mixture of nitric and sulfuric acid, in which the stoichiometric mole ratio of $HNO_3$ to HCl is in excess of 1:2, producing $Cl_2$ and water in a stream, said stream comprising a diluted mixture of nitrogen-containing species and sulfuric acid; and then
   (b) regenerating at least a substantial portion of the nitric acid by oxidation of said nitrogen-containing species in the stream; and then
   (c) removing at least a substantial portion of the water created in step (a) from the stream from step (b), to concentrate said sulfuric acid to a concentration in the range of about 60%–80%;
   (d) scrubbing said produced $Cl_2$ with sulfuric acid having a concentration in the range of 60%–80%;
   (e) returning sulfuric acid of step (d) to said process for use in step (a);
   (f) scrubbing vent gases produced in said process of nitrogen-containing species; and
   (g) reacting said scrubbed nitrogen-containing species of step (f) to form nitric acid and returning the nitric acid to said process for use in step (a).

* * * * *

UNITED STATES PATENT AND TRADEMARK OFFICE
CERTIFICATE OF CORRECTION

PATENT NO. : 6,355,223 B1
DATED : March 12, 2002
INVENTOR(S) : Wolfs, Warren M., Evanson, Eric W. and Brereton, Clive M.H.

It is certified that error appears in the above-identified patent and that said Letters Patent is hereby corrected as shown below:

Column 7,
Line 18, delete "$C_2$" and insert therefor -- $Cl_2$ --.

Signed and Sealed this

Second Day of August, 2005

JON W. DUDAS
*Director of the United States Patent and Trademark Office*